United States Patent

[11] 3,593,114

| [72] | Inventor | Alexandre Pierson |
| | | Le Chalet 38, Bivlers, France |
| [21] | Appl. No. | 808,079 |
| [22] | Filed | Mar. 18, 1969 |
| [45] | Patented | July 13, 1971 |
| [32] | Priority | Mar. 20, 1968 |
| [33] | | France |
| [31] | | 144633 |

[54] ELECTRICAL ISOLATING TRANSFORMER
8 Claims, 4 Drawing Figs.

[52] U.S. Cl. ........................................... 323/44, 336/175
[51] Int. Cl. ........................................... G05f 3/00, H02p 13/04
[50] Field of Search ........................................... 323/44; 321/26; 336/173, 174, 175

[56] References Cited
UNITED STATES PATENTS

| 2,810,053 | 10/1957 | Messner | 336/175 X |
| 3,028,528 | 4/1962 | Ghiselin, Jr. | 323/44 X |
| 3,255,404 | 6/1966 | Kidwell | 323/44 |

*Primary Examiner*—James D. Trammell
*Assistant Examiner*—G. Goldberg
*Attorney*—Cameron, Kerkam and Sutton ABSTRACT: An isolating transformer is described for transmitting AC electrical power from a power-supply circuit at ground potential to a load circuit which is at DC high voltage; the transformer comprises a single transfer loop equipped with insulation which withstands the DC voltage, which loop is inductively coupled to a first of said electrical circuits by way of a magnetic circuit completely surrounding the said turn, and inductively coupled to the other of said electrical circuits and at DC potential thereof.

ELECTRICAL ISOLATING TRANSFORMER

The invention relates to an electrical isolating transformer enabling electrical power in the form of alternating current to be transmitted between two circuits at widely differing steady electrical potentials.

In numerous fields, electrical power has to be delivered to a circuit which is at a very high potential with respect to earth (several hundred kilovolts or more) from a circuit which is at a first potential (for example that of earth). This is particularly the case with charged-particle accelerators or X-ray generators.

The solution hitherto generally adopted when it was necessary to deliver an appreciable amount of electrical power to a member at a very high potential with respect to earth (for example a heating filament in the case of an electron-accelerator) was as follows: An alternator was placed on a plate connected to this high potential and driven from an earthed motor by way of a long shaft (often several meters long) made of an electrically insulating material. This solution clearly exhibits numerous disadvantages more particularly that of excessive size and that of supporting the shaft.

Another solution which comes to mind resides in transmitting electrical power directly by way of an isolating transformer. In fact, conventional isolating transformers having windings buried in an insulating composition such as Araldite cannot in practice allow for potential differences between primary and secondary of several hundred kilovolts, and they then become prohibitively expensive.

The object of the invention is to provide an isolating transformer which complies better than those hitherto proposed with requirements encountered in practice, more particularly in that it may be constructed to withstand very high potential differences between its alternating-current power-supply circuit and its load circuits, while remaining simple and relatively cheap.

For this purpose, the invention proposes an isolating transformer comprising a single transfer turn equipped with insulation which withstands the said potential difference, which turn is inductively coupled to a first electrical circuit by way of a magnetic circuit completely surrounding the said turn, and coupled by any suitable means to a second electrical circuit, the said turn being at the steady potential of the second circuit, the first circuit being the alternating-current power-supply circuit and the second being the load circuit for the said current.

It will immediately be seen that the turn does not have to be wound round the magnetic circuit which surrounds it (coupling circuit to the first electrical circuit), and it is not necessary to bend it on a small radius: consequently, it may be provided with insulation which is as thick as is necessary to withstand the potential difference between the first circuit on the one hand, the circuit and the turn on the other hand, since the rigidity of the insulation is no longer a disadvantage. On the contrary, that part of the turn which is disposed close to the second circuit may be more lightly insulated, since this part is at a mean potential close to that of this circuit. Consequently, this part remains flexible, and therefore capable of being wound round one limb of a transformer of conventional type.

The invention will be better understood upon reading the following description of methods of using the invention which are given by way of nonlimitative examples.

FIG. 1 is a principle diagram of an isolating transformer in which the alternating-current power-supply circuit constitutes the first circuit defined above;

FIG. 2, which is similar to FIG. 1, shows an isolating transformer in which the load circuit constitutes the first circuit;

Figure 1:
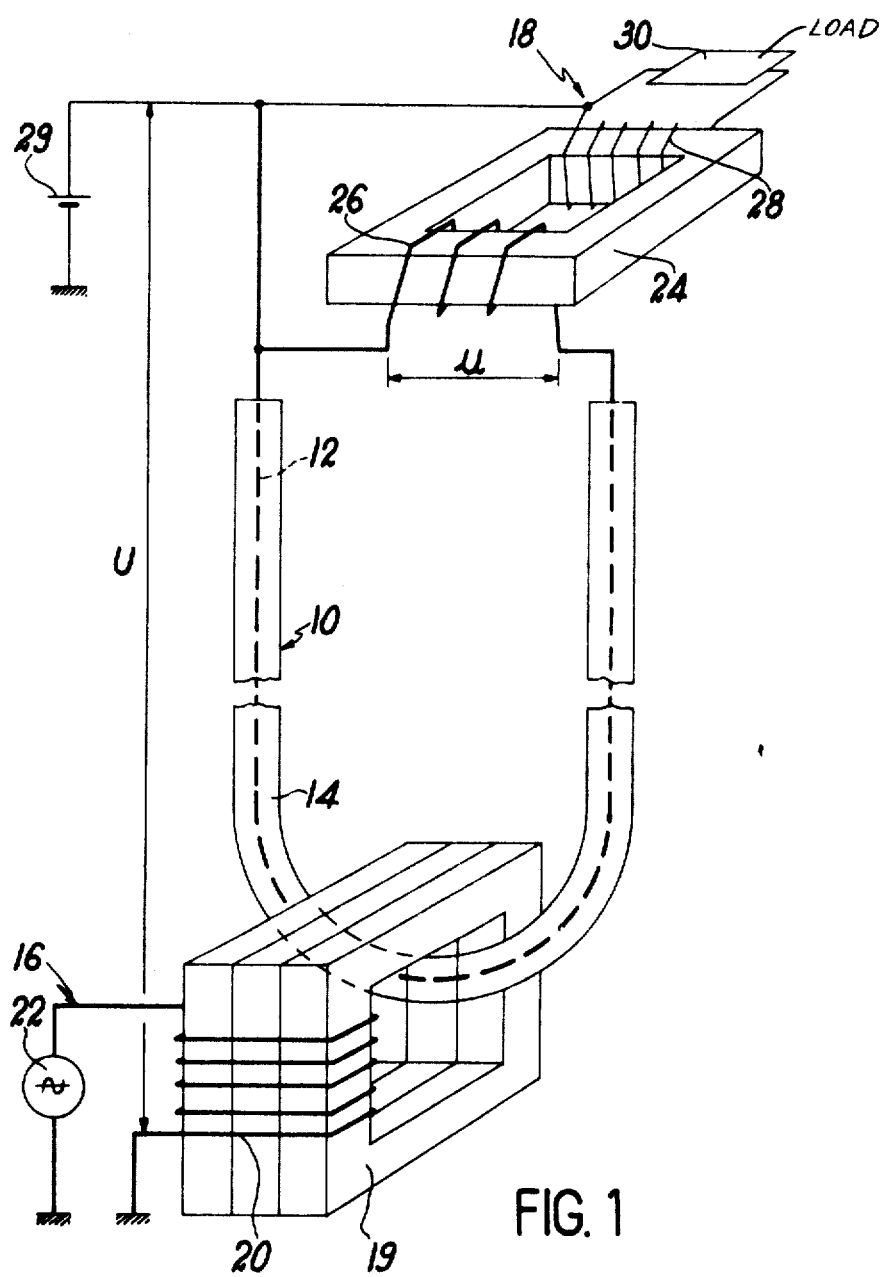

The isolating transformer diagrammatically illustrated in FIG. 1 comprises a single turn 10 made up of a large-section conductor 12 covered with electrical insulation intended to withstand the steady potential difference U between a power-supply circuit 16 and a load circuit 18 to which the transformer is required to transmit electrical power.

The turn may be made up of a commercial cable; such cables capable of withstanding 300 kilovolts or even 600 kilovolts are available. It is advantageous to choose from among these cables those equipped with insulation which is not solid, but takes the form of a winding. The turn may also be easily made by winding a sufficient thickness of insulating tape on to a solid copper conductor.

The turn 10 is inductively coupled to the power-supply circuit 16 by a magnetic circuit 19 made up of stacked laminations forming a frame which completely surrounds the turn 10. One of the limbs of the frame carries a winding 20 fed by an alternating-current generator (50- or 60-Hz. mains for example).

The turn 10 is likewise coupled by magnetic induction to the load circuit 18. This coupling comprises a frame 24 made up of a stack of ferromagnetic laminations whereof one of the limbs carries a winding 26 fed by the ends of the turn 12 and whereof another limb carries a winding 28 which feeds the load 30.

One of the ends of the winding 28 which is maintained, by means diagrammatically illustrated in the from of a source 29, at the potential U with respect to earth and therefore with respect to the winding 20. The potential-difference between the turns of the windings 26 and 28 remains low, and these windings may therefore be made in entirely conventional fashion.

It will be seen to be sufficient to insulate that portion of the turn 10 which is close to the circuit 16 and to the frame forming the magnetic circuit 19. In fact, the risk of the high voltage "creeping" along a solid insulator makes it necessary to leave sufficient length of insulation along the turn 10 starting from the magnetic circuit 19 (for example, if U=300 kv., about 80 cm. if the transformer 19 is disposed in air at normal pressure, and 25 cm. if the transformer is disposed in a gas under pressure).

The effective voltage available at the ends of the turn 10 (voltage U in FIG. 1) is a function of a plurality of parameters, and more particularly of the cross section of the magnetic circuit 19 and the voltage of the source 22 (and therefore of the induction set up in the circuit 19 by the winding 20).

Given that the turn 10 passes only once into the magnetic circuit 19, it will generally be necessary for the latter to be made of appreciably greater cross section than the circuit 24 in order that the valve $u$ may not be too small a fraction of the effective power-supply voltage delivered by the source 22. An attempt will generally be made to give the cross section of the circuit 19 a value of the order of $n$ times the cross section of the magnetic circuit 24, if $n$ is the number of turns of the winding 26.

Moreover, a high value will preferably be adopted for the induction in the laminations, for example 17,000 Gauss.

In certain cases in which the load 30 requires only a low voltage, coupling by the magnetic circuit 24 may be dispensed with, and the load 30 may be fed directly from the ends of the turn 10. This will be the case for example when supplying power to a heating filament in a charged-particle accelerator, which filament is usually fed at a voltage of 1 and 2.

Figure 2:
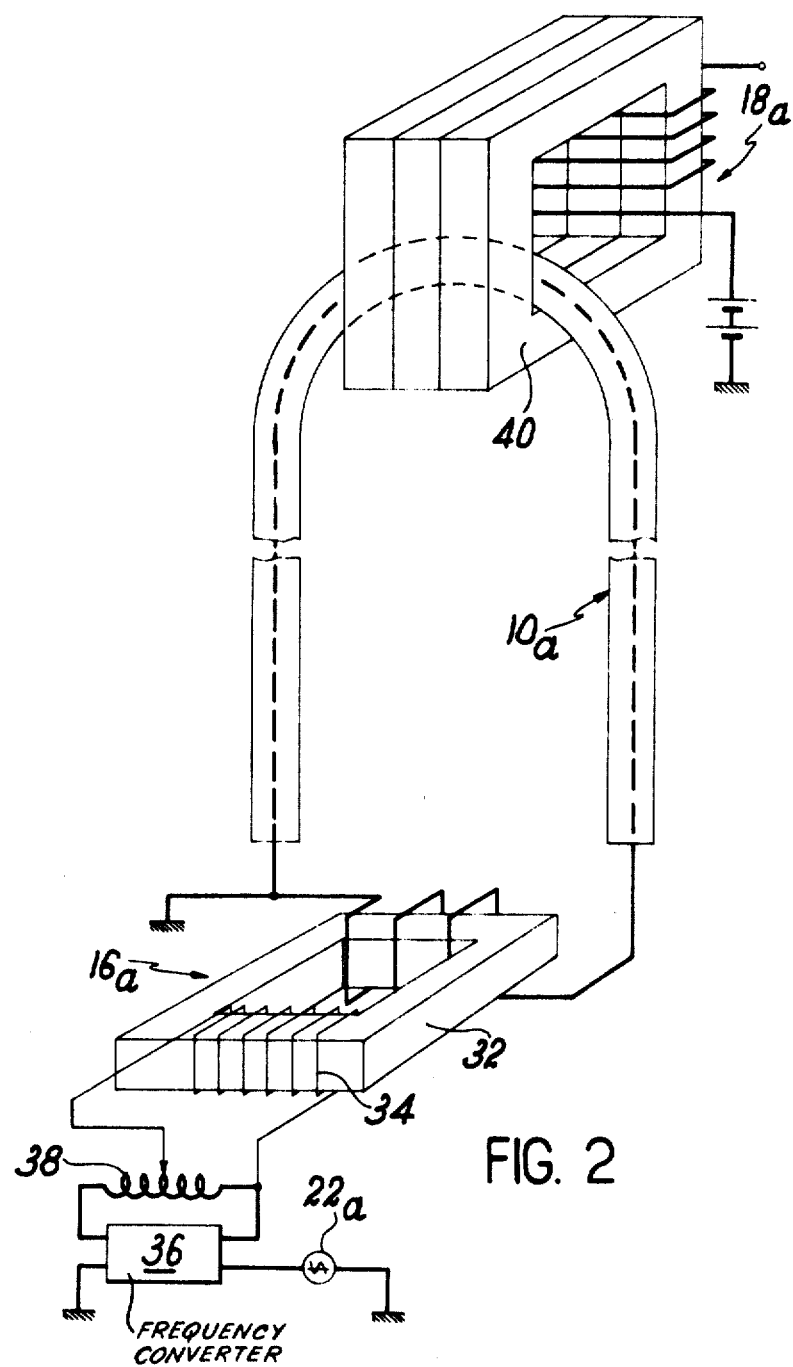

The isolating transformer illustrated in FIG. 2 uses an arrangement which may be considered to be the opposite of that of FIG. 1: the turn 10 a is taken to the potential of the power-supply circuit (generally earth potential). It is coupled to the power-supply circuit 16 a by a magnetic circuit 32 which may be likened to the core of a second transformer of conventional type. The winding 34 of the transformer 32 is fed from the source 22 a via a frequency-converter 36 which for example enables the mains frequency (50-Hz. or 60-Hz. to be changed to a few hundred Hertz and by an adjustable transformer 38 (Variac) which enables the voltage delivered to be adjusted. Coupling to the load circuit 18 a takes place by way of a magnetic circuit 40 which is generally of appreciably greater cross section than the magnetic circuit 32. When the frequency used is high, the magnetic circuits are advantageously made of ferrite.

A plurality of magnetic circuits, similar to the circuit 40, each connected to an electrical load circuit, may clearly be placed on the turn, but this solution is often of little advantage since it does not enable the alternating voltages fed to these circuits to be adjusted independently.

Figure 3:
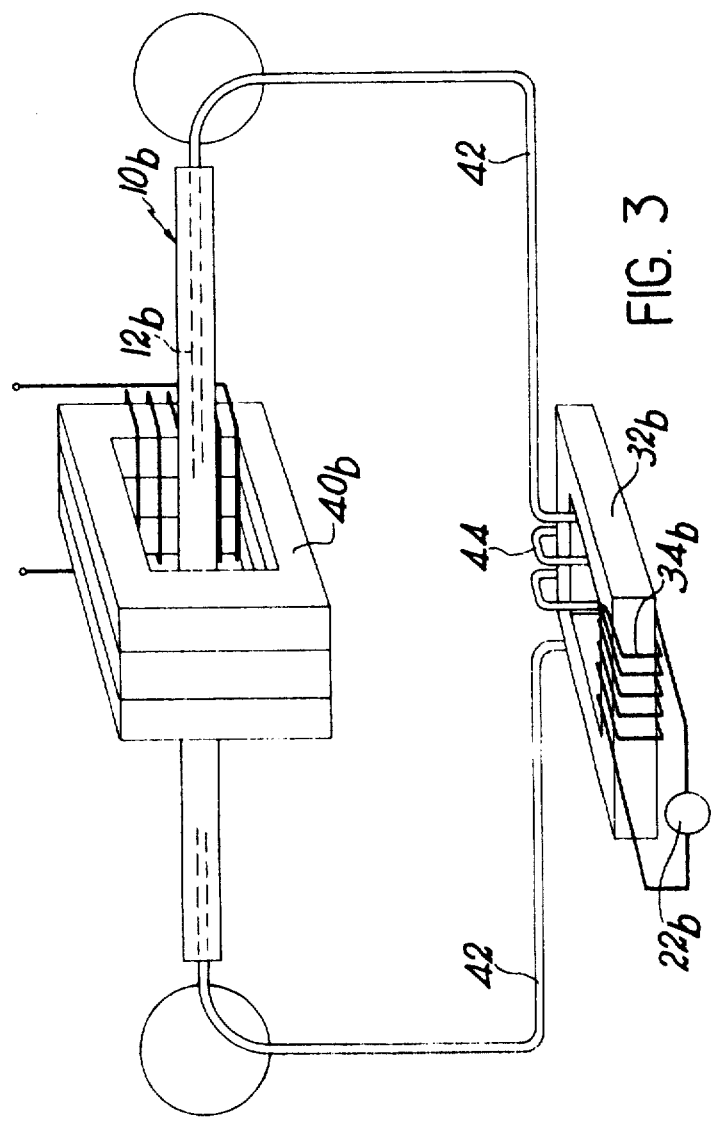
FIG. 3 shows a possible arrangement of the components of an isolating transformer of the type diagrammatically illustrated in FIG. 2, which arrangement is particularly adapted to being fitted in a container in which there is insulating gas under pressure.

When the steady potential difference is particularly high (a few hundred kv. upwards), it is preferable to dispose the isolating transformer in an enclosure containing a gas at a pressure of a few bars. If for example sulfur hexafluorine $SF_6$ at 5 bars is used instead of air atmospheric pressure, the insulating distance at 300 kv. is 3 cm. instead of about 40 cm. In this case, the arrangement illustrated in FIG. 3 is of particular interest. In FIG. 3 (in which the members corresponding to those already illustrated in FIG. 2 bear the same reference numbers followed by the index b) there is a turn 10 b reduced to a bar covered with a layer of insulation which is sufficient to withstand the potential-difference between the source and the load circuit. The ends of the bar 12 b are connected by lightly insulated conductors 42 to a winding 44. This winding is coupled to a winding 34 b, which is fed by the source 22 b, by a magnetic circuit 32 b. The bar 12 b passes through a closed magnetic circuit providing coupling to the load circuit, maintained for example by an equipotential plate at the mean steady voltage of the load circuit.

Figure 4:
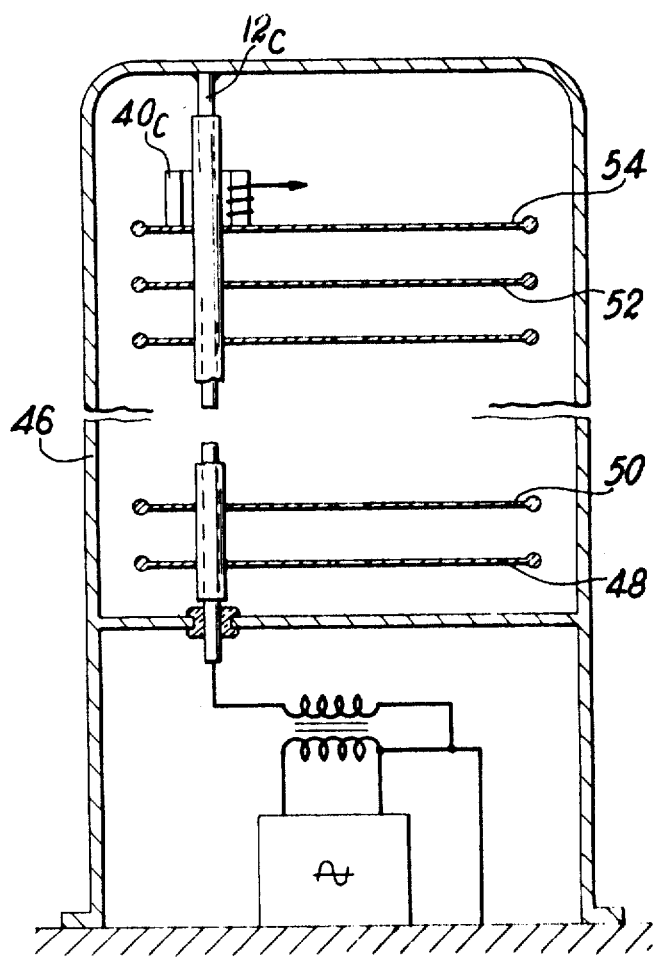
FIG. 4 shows in very diagrammatic fashion a possible arrangement of an isolating transformer according to the invention in the container of a generator which supplies a high steady voltage between the power-supply circuit which is at mean earth potential and the load circuit.

Of the practical arrangements capable of being used, that of FIG. 4 is often preferable, more particularly when the transformer is disposed in the container of a particle-accelerator, and when the steady potential-difference between the source and the load circuit is set up by a device of the type described in pending Pat. application No. 808,222 filed this day for "Device for producing a high steady potential difference" by the applicant in the present application. A plurality of transformers of the type shown in FIG. 4 will then be used in order to supply power to an ion-accelerator, each delivering a few hundred watts of alternating power. On the contrary, an X-ray appliance will need only a single transformer in order to feed the filament at low voltage.

The isolating transformer illustrated in FIG. 4 is disposed in the metal container 46 of the accelerator at earth potential. The turn is reduced to a bar 12 c insulated from the equipotential plates 48, 50...., 52, 54 through which it passes. If it is assumed for example that the last plate 54 is maintained at =300 kv. with respect to the earth, it will be necessary for the bar to be insulated for at least 80 cm. above the plate in order to avoid "creeping" along the insulator if it is in the air. The insulator may clearly be thinner at the level of the lower plates 48, 50, ..... at which the potential-difference with respect to the bar will be only, for example, 25 kv., 50 kv.,... However, economic reasons will generally preclude the use of this possibility, and lead to the use of a piece of commercial cable whereof the insulation is the same throughout.

The upper end of the bar 12 c is connected to the container 46, which constitutes a return conductor. Its lower end is connected to a transformer winding similar to the winding 44 FIG. 3. The bar is coupled to the load circuit (not illustrated) by a magnetic circuit 40 c (comprising an annular cylinder of wound strip-iron for example) on which is wound a secondary of a few tens of turns or a few hundred turns, according to the required alternating voltage.

I claim:

1. Insulating transformer for transmitting AC power from a power supply circuit to a load circuit which is at a widely different electrical potential, comprising a single turn electrical line, insulation on part at least of the length of said line which withstands the potential differences, said line being inductively coupled to a first electrical circuit by passing once through a closed magnetic circuit completely surrounding said single turn electrical line in the insulated portion thereof and said line being directly connected or inductively coupled to a second electrical circuit, said single turn line being at the potential of said second circuit, one of said first and second circuits being the alternating current power-supply circuit and the other of said circuits being the load circuit.

2. Transformer according to claim 1 wherein the alternating-current power-supply circuit constitutes the said first circuit and the power-supply circuit comprises a winding on one of the limbs of the said limbs of the said magnetic circuit.

3. Transformer according to claim 1 wherein the said second circuit is directly connected to the ends of said single turn line.

4. Transformer according to claim 1 wherein, said single turn line is coupled to said second circuit by magnetic induction.

5. Transformer according to claim 4, wherein said single turn line is connected to a winding having n turns is connected to a winding having n turns, n being a predetermined number, on one of the limbs of a second magnetic coupling circuit whereof another limb carries a winding connected to said second circuit, and wherein the cross section of the magnetic circuit which couples said single turn line to said first circuit has n times the cross section of said second magnetic circuit.

6. Transformer according to claim 1 wherein the load circuit constitutes the said first circuit.

7. Transformer according to claim 6 wherein said load circuit and said magnetic circuit are carried by an equipotential plate of a high voltage D.C. generator and the power supply is at earth potential.

8. Transformer according to claim 4, wherein the ends of said single turn line are connected to a winding having less electrical insulation than that of said line.